United States Patent
Camacho Cardenas et al.

(10) Patent No.: US 10,689,953 B2
(45) Date of Patent: Jun. 23, 2020

(54) ORIENTATION MEASUREMENTS FOR RIG EQUIPMENT

(71) Applicant: Schlumberger Technology Corporation, Sugar Land, TX (US)

(72) Inventors: Alejandro Camacho Cardenas, Houston, TX (US); Vishwanathan Parmeshwar, Houston, TX (US); Manat Singh, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 71 days.

(21) Appl. No.: 15/986,446

(22) Filed: May 22, 2018

(65) Prior Publication Data

US 2019/0360311 A1    Nov. 28, 2019

(51) Int. Cl.
   *E21B 15/00* (2006.01)
   *E21B 41/00* (2006.01)
   *G01C 19/00* (2013.01)

(52) U.S. Cl.
   CPC .......... *E21B 41/0092* (2013.01); *E21B 15/00* (2013.01); *G01C 19/00* (2013.01)

(58) Field of Classification Search
   CPC ..... G01C 19/00; E21B 41/0092; E21B 15/00; E21B 19/165; E21B 19/20; E21B 7/02; E21B 7/022; E21B 12/00; E21B 15/003; E21B 19/00; E21B 19/08; E21B 19/10; E21B 19/16
   See application file for complete search history.

(56) References Cited

U.S. PATENT DOCUMENTS

| | | |
|---|---|---|
| 6,898,968 B2 | 5/2005 | Biester et al. |
| 7,062,960 B2 | 6/2006 | Couren et al. |
| 7,274,989 B2 | 9/2007 | Hopper |
| 7,302,842 B2 | 12/2007 | Biester et al. |
| 7,925,472 B2 | 4/2011 | Nasr et al. |
| 8,347,957 B2 | 1/2013 | Stephenson et al. |
| 8,490,705 B2 | 7/2013 | Curtiss, III |
| 8,503,190 B2 | 8/2013 | Tart et al. |
| 8,554,717 B2 | 10/2013 | Reckmann et al. |
| 8,560,096 B1 | 10/2013 | Chapman et al. |
| 8,560,097 B1 | 10/2013 | Chapman et al. |
| 8,560,098 B1 | 10/2013 | Chapman et al. |
| 8,583,597 B2 | 11/2013 | Atamna et al. |
| 8,676,721 B2 | 3/2014 | Piovesan et al. |
| 8,761,910 B1 | 6/2014 | Chapman, Jr. et al. |
| 8,761,911 B1 | 6/2014 | Chapman et al. |
| 8,761,912 B1 | 6/2014 | Chapman, Jr. et al. |
| 8,781,743 B2 | 7/2014 | McKay et al. |
| 8,819,652 B2 | 8/2014 | Zingelewicz et al. |
| 8,825,567 B2 | 9/2014 | Jiang et al. |
| 8,898,525 B2 | 11/2014 | Loganathan et al. |
| 8,978,699 B2 | 3/2015 | Jaffrey et al. |

(Continued)

FOREIGN PATENT DOCUMENTS

WO    2016026680 A1    2/2016

*Primary Examiner* — Brad Harcourt
(74) *Attorney, Agent, or Firm* — Rachel E. Greene

(57) ABSTRACT

A drilling rig system may include a drilling rig including a plurality of surface rig equipment thereon and a plurality of orientation sensors disposed on the plurality of surface rig equipment. The plurality of orientation sensors may be configured to provide relational positioning of the plurality of surface rig equipment on the drilling rig.

9 Claims, 6 Drawing Sheets

(56) References Cited

U.S. PATENT DOCUMENTS

| | | |
|---|---|---|
| 9,053,468 B2 | 6/2015 | Haynes et al. |
| 9,110,452 B2 | 8/2015 | Blevins et al. |
| 9,163,471 B2 | 10/2015 | Coonrod et al. |
| 9,187,974 B2 | 11/2015 | Coonrod et al. |
| 9,260,943 B2 | 2/2016 | Eriksson et al. |
| 9,410,392 B2 | 8/2016 | Jaffrey et al. |
| 9,546,545 B2 | 1/2017 | Cardellini et al. |
| 9,634,581 B2 | 4/2017 | Jaffrey |
| 9,658,130 B2 | 5/2017 | Veeningen |
| 9,677,573 B2 | 6/2017 | Jaffrey |
| 9,732,879 B2 | 8/2017 | Jaffrey |
| 9,804,039 B2 | 10/2017 | Reyes et al. |
| 9,869,404 B2 | 1/2018 | Jaffrey et al. |
| 9,964,135 B2 | 5/2018 | Jaffrey et al. |
| 9,970,569 B2 | 5/2018 | Kotrla et al. |
| 9,988,870 B2 | 6/2018 | Gray |
| 10,087,745 B2 | 10/2018 | Gottlieb et al. |
| 10,151,160 B2 | 12/2018 | Jaffrey et al. |
| 10,161,225 B2 | 12/2018 | Jaffrey et al. |
| 10,175,287 B2 | 1/2019 | Jaffrey et al. |
| 10,246,994 B2 | 4/2019 | Jaffrey |
| 10,248,141 B2 | 4/2019 | McKeon et al. |
| 10,256,676 B2 | 4/2019 | Gray |
| 10,273,774 B2 | 4/2019 | Jaffrey |
| 10,287,869 B2 | 5/2019 | Jaffrey |
| 2004/0028476 A1* | 2/2004 | Payne .................... E21B 7/046 405/184 |
| 2013/0343858 A1* | 12/2013 | Flusche ................ E21B 7/026 414/800 |
| 2014/0121973 A1 | 5/2014 | Buchanan et al. |
| 2015/0022326 A1 | 1/2015 | Baxter et al. |
| 2015/0218895 A1* | 8/2015 | Hassan ................ E21B 19/165 175/24 |
| 2015/0356521 A1 | 12/2015 | Sridhar et al. |
| 2016/0123785 A1 | 5/2016 | Gaude |
| 2016/0131692 A1 | 5/2016 | Jaffrey |
| 2016/0186516 A1 | 6/2016 | Jaffrey |
| 2016/0292652 A1 | 10/2016 | Bowden, Jr. et al. |
| 2016/0371957 A1 | 12/2016 | Ghaffari et al. |
| 2017/0058661 A1 | 3/2017 | Gray |
| 2017/0074067 A1 | 3/2017 | Jaffrey et al. |
| 2017/0130575 A1 | 5/2017 | Jaffrey |
| 2017/0138151 A1 | 5/2017 | Reyes et al. |
| 2018/0142543 A1 | 5/2018 | Gupta et al. |
| 2018/0179854 A1 | 6/2018 | Healy |
| 2018/0334865 A1* | 11/2018 | Miller .................... E21B 19/24 |

\* cited by examiner

ORIENTATION MEASUREMENTS FOR RIG EQUIPMENT

BACKGROUND

A drilling rig system is used in common drilling methods and systems used in drilling boreholes to produce oil or other hydrocarbons. A drilling rig system may include a surface system disposed above ground at the well site and a downhole system disposed below ground. The surface system may include a substructure, a mast, and other surface equipment.

When the drilling rig system is assembled, the mast may be raised from a substantially horizontal rig-down configuration to a substantially vertical rig-up configuration using raising cylinders. It may be desired to monitor an orientation and/or position of the raising cylinders and/or the mast during this process. If the orientation of the raising cylinders and/or the mast is not known, the mast may not be oriented vertically when it is installed, which may result in uneven distribution of stresses on the mast thereby limiting the load handling capacity of the mast and may eventually result to catastrophic failure.

During operation of the drilling rig system, surface equipment may experience movement due to the operations and/or environmental conditions. It may be desired to monitor an orientation and/or position of pieces of surface equipment during rig operations. If rig operations are performed without such measurements, operations may be continued without adjustment when the surface equipment is misaligned, leading to incorrect procedures, damage to equipment, and potentially catastrophic failure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure relates to a drilling rig system which may include a drilling rig comprising a plurality of surface rig equipment thereon and a plurality of orientation sensors disposed on the plurality of surface rig equipment. The plurality of orientation sensors may be configured to provide relational positioning of the plurality of surface rig equipment on the drilling rig.

In another aspect, the present disclosure relates to a method of rigging up a drilling rig which may include the following steps: raising a mast and a substructure of the drilling rig using at least one hydraulic cylinder; measuring a position and/or an orientation of at least one of the mast, the substructure, and the at least one hydraulic cylinder; and positioning the hydraulic cylinder based on the position and/or the orientation of the mast, the substructure, and/or the at least one hydraulic cylinder.

In another aspect, the present disclosure relates to a method of monitoring a drilling rig comprising a plurality of surface rig equipment including the following steps: measuring an orientation and/or a position of a first of the plurality of surface rig equipment; measuring an orientation and/or a position of a second of the plurality of surface rig equipment; and determining a relational positioning of the plurality of surface rig equipment.

Other aspects and advantages of the claimed subject matter will be apparent from the following description and the appended claims.

DETAILED DESCRIPTION

Figure 1:
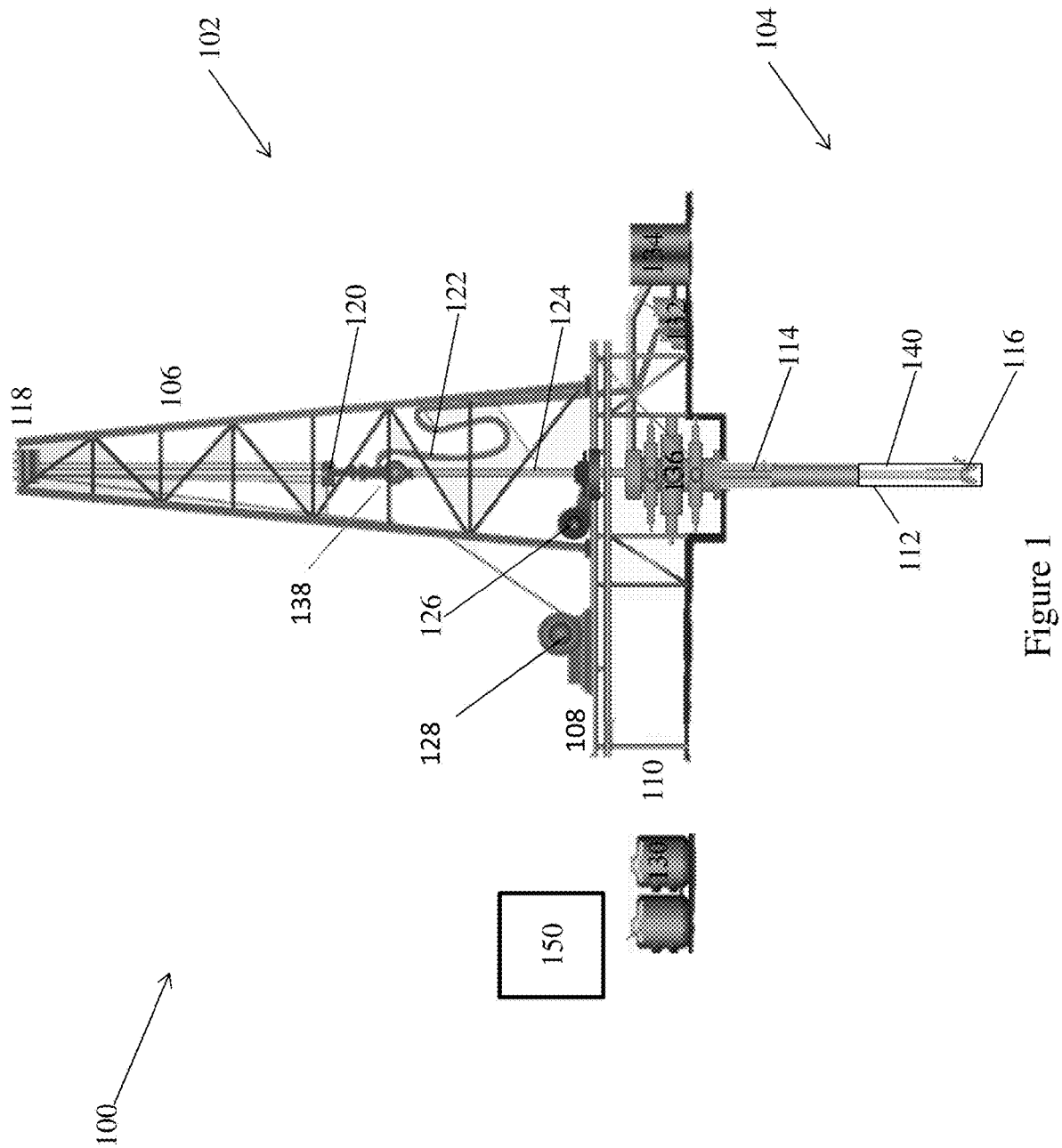
FIG. 1 is a drilling rig system in accordance with the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

As used herein, the term "coupled" or "coupled to" or "connected" or "connected to" may indicate establishing either a direct or indirect connection, and is not limited to either unless expressly referenced as such.

In one aspect, embodiments disclosed herein relate to a drilling rig system. The drilling rig system may include surface rig equipment and orientation sensors disposed on the surface rig equipment. Orientation sensors may be configured to measure relative positions of the surface rig equipment and may provide relational positioning of the plurality of surface rig equipment on the drilling rig.

FIG. 1 illustrates a drilling rig system 100. The system 100 may include a surface system 102, a downhole system 104, and a processor 150. The drilling rig system 100 may form a borehole 112 via rotary drilling in a manner that is well known. Those of ordinary skill in the art given the benefit of this disclosure will appreciate however that embodiments of the present disclosure may be applied to drilling applications other than conventional rotary drilling (e.g. mud-motor based directional drilling) and is not limited to land based rigs.

The surface system 102 may include a mast 106, a floor 108, and a substructure 110, which may be positioned over the borehole 112. The surface system 102 may further include a crown block 118 disposed at the top of the mast 106, a traveling block 120 suspended from the crown block 118, a kelly 124 suspended from the traveling block 120 via a swivel 138, and a rotary drive 126 configured to rotate the kelly 124. The surface system 102 may include drawworks 128 disposed on the floor 108, and engines 130, mud pumps 132, and a mud pit 134 disposed proximate the substructure 110. The mud pit 134 may contain mud or another drilling fluid. The mud pumps 132 may be connected to the kelly 124 via a standpipe 122. The surface system 102 may include a blow-out preventer 136 disposed proximate the borehole 112.

The components of the surface system 102 may be collectively referred to as surface equipment. One skilled in the art will recognize a surface system 102 of a drilling rig system 100 may include surface equipment which is not described above or may not include all of the surface equipment which is described above without departing from the scope of the disclosure. The surface equipment may be arranged in any configuration known in the art without departing from the scope of the disclosure.

The downhole system 104 may include a drill string 114 suspended within the borehole 112. The drill string 114 may be suspended from the kelly 124 of the surface system 102. A drill bit 116 may be disposed on a lower end of the drill string 114. Mud or drilling fluid from the mud pit 134 may be pumped through the kelly 124, into the drill string 114, such that the mud or drilling fluid may exit ports on the drill bit 116 and circulate upwards through an annulus 140 between the drill string 114 and the inside of the borehole 112.

Figure 2:
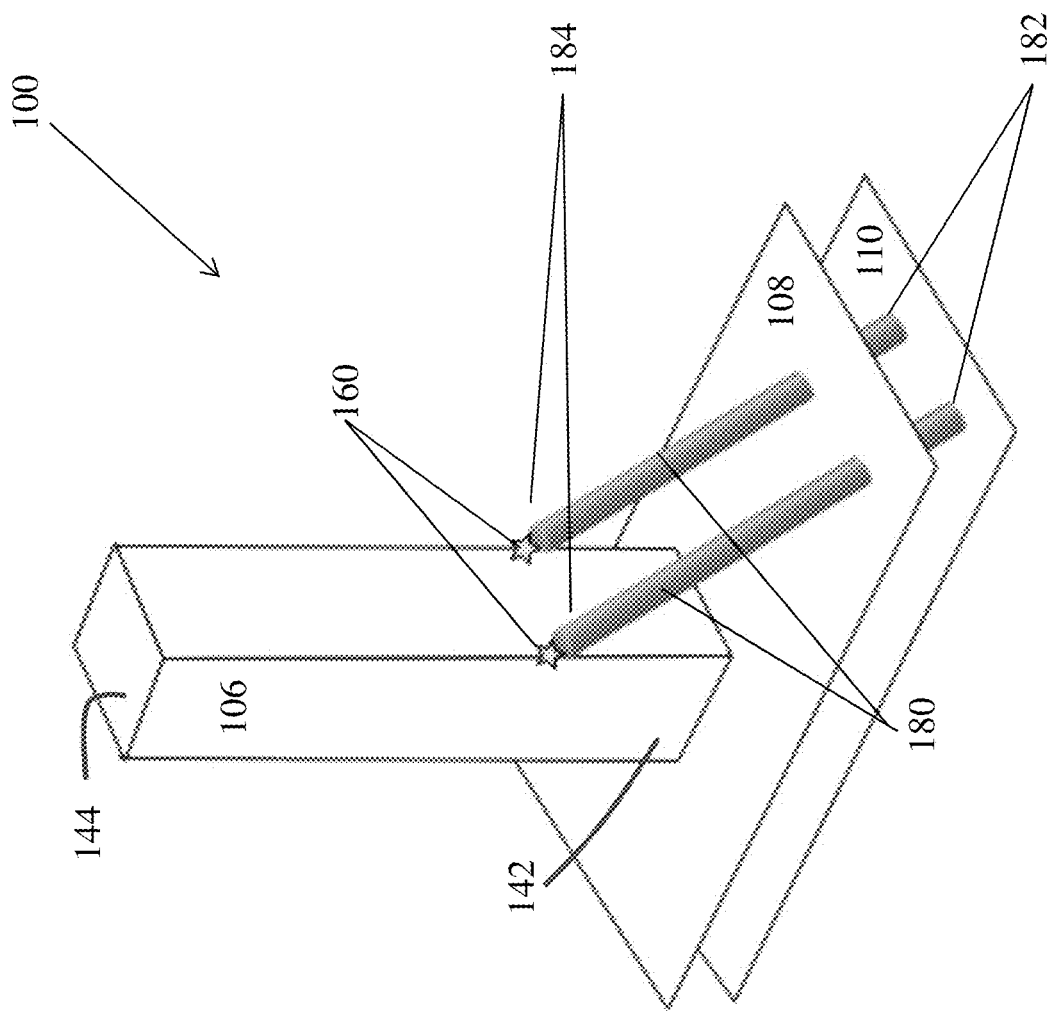
FIG. 2 is a schematic view of a drilling rig system in accordance with the present disclosure.

The drilling rig system 100 may include one or more orientation sensors 160 disposed on the surface equipment. As illustrated in FIG. 2, orientation sensors 160 may be disposed on the mast 106, the floor 108, and/or the substructure 110. In some embodiments, the orientation sensors 160 may be disposed on any element of surface equipment which is part of the surface system 102 of the drilling rig system 100. The drilling rig system 100 may include any number of orientation sensors 160 arranged in any configuration on the surface equipment without departing from the scope of the disclosure.

Locations at which orientation sensors 160 may be disposed include: mud pumps 132, drawworks 128, top-drives (not illustrated), pipe handlers (not illustrated), torque machines (not illustrated), masts 106, substructures 110, mud pits/tanks 134, cat-walks (not illustrated), shakers (not illustrated), generators (not illustrated), and control rooms (not illustrated). Orientation sensors 160 may be disposed at any combination of the locations listed above and/or at locations not listed above.

Each of the orientation sensors 160 may be configured to measure the orientation of the piece of surface equipment to which the orientation sensor 160 is attached. In some instances, a piece of surface equipment may be considered a rigid body and the orientation sensor 160 may be considered to measure the orientation of the entire piece of surface equipment. In other instances, a piece of surface equipment may be considered a non-rigid body and the orientation sensor 160 may be considered to measure an orientation of a local region of the piece of surface equipment. For example, the mast 106 may be considered non-rigid. Two or more orientation sensors 160 may be disposed on a non-rigid piece of surface equipment to measure the orientation of different local regions of the piece of surface equipment.

The orientation sensors 160 may be connected to the processor 150. The processor 150 and the orientation sensors 160 may be connected via a wireless or wired network. The network may or may not include additional components. In some embodiments, as shown in FIG. 1, the processor 150 may be proximate other components of the drilling rig system 100. In some embodiments, the processor 150 may be at a location distant from other components of the drilling rig system 100.

Figure 5B:
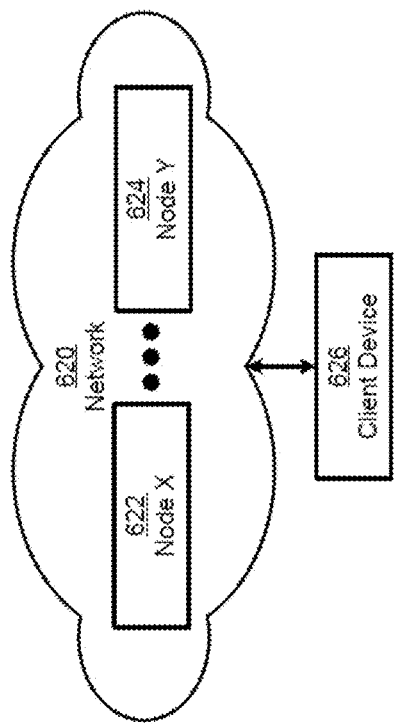
FIG. 5*b* is a schematic of a computing system in accordance with the present disclosure.
Figure 5A:
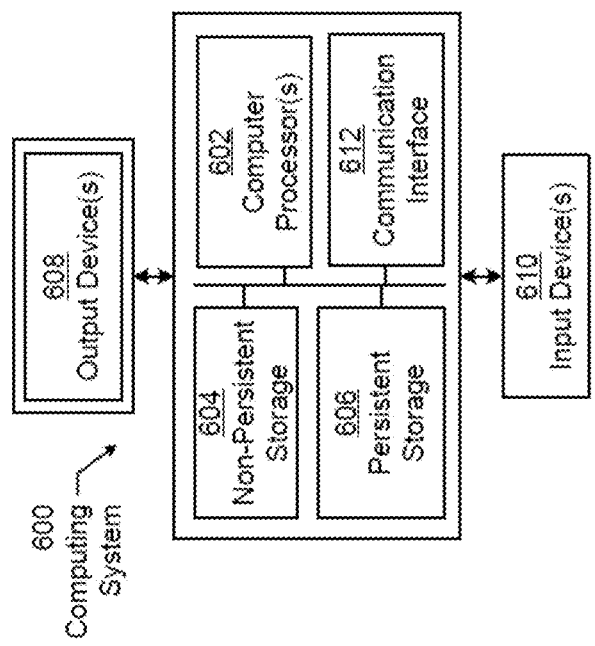
FIG. 5*a* is a schematic of a computing system in accordance with the present disclosure.

Embodiments of the present disclosure may be implemented on a computing system. The computing system may include at least the processor 150 and orientation sensors 160. The computing system may include processors or PLCs connected to specific elements of the drilling rig site. Any combination of mobile, desktop, server, router, switch, embedded device, or other types of hardware may be used. For example, as shown in FIG. 5a, the computing system 600 may include one or more computer processors 602, non-persistent storage 604 (e.g., volatile memory, such as random access memory (RAM), cache memory), persistent storage 606 (e.g., a hard disk, an optical drive such as a compact disk (CD) drive or digital versatile disk (DVD) drive, a flash memory, etc.), a communication interface 612 (e.g., Bluetooth interface, infrared interface, network interface, optical interface, etc.), and numerous other elements and functionalities.

The computer processor(s) 602 may be an integrated circuit for processing instructions. For example, the computer processor(s) may be one or more cores or micro-cores of a processor. The computing system 600 may also include one or more input devices 610, such as a touchscreen, keyboard, mouse, microphone, touchpad, electronic pen, or any other type of input device.

The communication interface 612 may include an integrated circuit for connecting the computing system 600 to a network (not shown) (e.g., a local area network (LAN), a wide area network (WAN) such as the Internet, mobile network, or any other type of network) and/or to another device, such as another computing device.

Further, the computing system 600 may include one or more output devices 608, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 602, non-persistent storage 604, and persistent storage 606. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system 600 in FIG. 5a may be connected to or be a part of a network. For example, as shown in FIG. 5b, the network 620 may include multiple nodes (e.g., node X 622, node Y 624). Each node may correspond to a computing system, such as the computing system shown in FIG. 5a, or a group of nodes combined may correspond to the computing system shown in FIG. 5a. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 700 may be located at a remote location and connected to the other elements over a network.

In some embodiments, the processor 150 may perform calculations based on the measurements transmitted by the orientation sensors 160. In some embodiments, the processor 150 may command elements of the drilling rig system 100 based on the measurements and/or calculations. Methods by which orientation measurements may be collected and used are described in detail later in this disclosure.

The orientation sensors 160 may be any type of sensor known in the art capable of measuring orientation or measuring one or more properties which may be used to calculate orientation. In some embodiments, the orientation sensors 160 may be dedicated orientation sensors which measure orientation directly. In some embodiments, the orientation sensors 160 may be gyroscope sensors which measure changes in angular velocity along a rotational axis. The orientation sensors 160 may be configured to calculate orientation based on the rotational rate measurements or the orientation sensors 160 may transmit the rotational rate measurements to the processor 150 which may calculate orientation by integrating the rotational rate from an initial known orientation. In some embodiments, the orientation sensors 160 may be accelerometers which measure acceleration. The orientation sensors 160 may be configured to calculate orientation based on the acceleration measurements or the orientation sensors 160 may transmit the acceleration measurements to the processor 150 which may calculate orientation by integrating the change in acceleration along the sensing axis. In embodiments of the drilling rig system 100 which include more than one orientation sensor 160, the orientation sensors 160 may or may not be of the same type.

The orientation sensors 160 may be single-axis or multi-axis sensors. A single-axis orientation sensor may measure the orientation of the piece of surface equipment to which it is attached about one axis. A multi-axis sensor may measure the orientation of the piece of surface equipment to which it is attached about two or three axes. In some embodiments, multiple single-axis sensors may be attached to a piece of surface equipment to measure the orientation of the piece of surface equipment about different axes. In embodiments of the drilling rig system 100 which include more than one orientation sensor 160, the orientation sensors 160 may or may not make measurements about the same number of axes.

The orientation sensors 160 may be permanent or temporary. Permanent orientation sensors 160 may be attached to the surface equipment at all times and may or may not be readily removable from the surface equipment. Permanent orientation sensors 160 may be attached to the surface equipment for the lifespan of the equipment or for the lifespan of the orientation sensors 160. Temporary orientation sensors 160 may be attached to the surface equipment at times when it is desired to take orientation measurements and may be readily removable from the surface equipment. The drilling rig system 100 may include means (not shown) to aid the proper installation of temporary or permanent orientation sensors 160. For example, the rig system may include markings, protrusions, and/or attachments indicating the placement and alignment of orientation sensors.

Using permanent orientation sensors 160 may reduce the complexity to setup and configure the orientation sensors 160. Using temporary orientation sensors 160 may allow orientation sensors 160 to be used with more than one drilling rig system 100. In embodiments of the drilling rig system 100 which include more than one orientation sensor 160, the orientation sensors 160 may all be permanent sensors, all be temporary sensors, or be a combination of permanent and temporary sensors.

The orientation sensors 160 may be powered by local power sources or external power sources. Locally powered orientation sensors 160 may be coupled to a local power source (not illustrated) such as a battery, which may be installed on the drilling rig system 100 proximate the orientation sensors 160. A local power source may power one or more orientation sensors 160. Externally powered orientation sensors 160 may be connected to an external power source (not illustrated), such as a rig generator. An external power source may power surface equipment in addition to orientation sensors 160. In embodiments of the drilling rig system 100 which include more than one orientation sensor 160, the orientation sensors 160 may all be externally powered sensors, all be locally powered sensors, or be a combination of locally and externally powered sensors.

The orientation sensors 160 may transmit orientation measurements either in real-time or on command. Real-time orientation sensors 160 may transmit orientation measurements to the processor 150 immediately after each orientation measurement is made. Real-time orientation sensors 160 may be used in embodiments in which adjustments to system operations are made based on orientation measurements or derivative calculations. On-command orientation sensors 160 may transmit orientation measurements to the processor 150 when a transmission is requested. Transmissions may be requested manually or may be requested automatically at predetermined intervals or after certain events. On-command sensors may require reduced power compared to real-time sensors. In embodiments of the drilling rig system 100 which include more than one orientation sensor 160, the orientation sensors 160 may all be real-time sensors, all be on-command sensors, or be a combination of real-time and on-command sensors.

In some embodiments, the surface equipment may be outfitted with any type of sensors known in the art in addition to the orientation sensors 160. The sensors may transmit data to the processor 150. In some embodiments, downhole equipment which is part of the downhole system 104 may be outfitted with sensors. The sensors disposed on the downhole equipment may transmit data to the processor 150. The sensors disposed on the downhole equipment may be any type of sensors known in the art, including orientation sensors. The processor 150 may perform calculations using data from both the orientation sensors 160 and the other sensors disposed on the surface equipment and/or the sensors disposed on the downhole equipment.

In another aspect, embodiments disclosed herein relate to methods of setting up a drilling rig system. The methods disclosed herein may be implemented using a drilling rig system 100 as described above, or any drilling rig system known in the art.

Setting up a drilling rig system 100 may involve raising a mast 106 of the drilling rig system from a mast-down position to a mast-up or operational position. FIG. 2 illustrates a drilling rig system 100 which includes a mast 106 and a substructure 110. The substructure 110 may be installed proximate a well site using any means known in the art. The mast 106 may be disposed on the substructure 110 in a horizontal, mast-down configuration. A lower end 142 of the mast 106 may be secured to the floor 108.

The mast 106 may be raised using one or more raising cylinders 180. The raising cylinders 180 may be hydraulic cylinders or any type of actuator known in the art. In some embodiments, as illustrated in FIG. 2, the mast 106 may be raised using two raising cylinders 180. A lower end 182 of each of the raising cylinders 180 may be disposed on the substructure 110. An upper end 184 of each of the raising cylinders 180 may be attached to the mast 106. The raising cylinders 180 may be configured such that extending the raising cylinders 180 raises an upper end 144 of the mast 106 relative to the substructure 110 and retracting the raising cylinders 180 lowers the upper end 144 of the mast 106 relative to the substructure 110.

When the mast 106 is being raised, it may be desired to extend the raising cylinders 180 simultaneously, such that each of the one or more raising cylinders 180 is extended the same amount at the same time. An orientation sensor 160 may be disposed on each of the raising cylinders, proximate the upper end 184. In some embodiments, orientation sensors may be disposed at any location on the raising cylinders 180 or the mast 106. It may be desired that the raising cylinders 180 have the same orientation at the same time.

Each of the orientation sensors 160 may measure an orientation and/or a position of the raising cylinder 180 to which it is attached. In some embodiments, the measurements may be made in real-time as the raising cylinders 180 are being extended. Orientation measurements made by the orientation sensors 160 made at a given time may be compared to each other. A difference between the orientations measured by the orientation sensors may be calculated. The difference may be compared to a threshold value. The threshold value may be chosen based on properties of the mast 106, the raising cylinders 180, and other components of the rig system 100. If the difference is less than the threshold value, the raising cylinders 180 may continue being extended with no change to the operation. If the difference is greater than the threshold value, the operation may be adjusted or halted. For example, in some embodiments, one of the raising cylinders 180 may stop being extended until both raising cylinders 180 are at the same orientation or until the difference between the orientations of the raising cylinders 180 is lower than the threshold value. In some embodiments, both raising cylinders 180 may stop being extended. This may allow a human operator to adjust the mast 106 and or the raising cylinders 180.

This procedure may continue until the mast 106 is in the vertical, rig-up configuration. When the mast 106 is in the rig-up configuration, it may be approximately or exactly normal to the surface of the substrate 190. Using the system 100 and method disclosed herein may allow the mast 106 to be installed more precisely than previously used methods and systems. This may ensure that the mast 106 is in an optimal load-carrying position, in which it is capable of bearing the maximum amount of weight. Such a position may prevent the mast 106 from tipping over or bending. The system 100 may operate more efficiently with the mast 106 in such a position. Thereby, the system 100 and method disclosed herein may prevent damage to the mast 106 and other components of the system 100, may reduce the amount of downtime the system 100 must experience for repairs, and may prevent catastrophic failure of the system 100. Further, it is also envisioned that instead of (or in addition to) orientation sensors 160 being placed on raising cylinders 180, orientation sensors may be placed on mast 106, such as at two different positions on mast 106 including each end thereof, such that the relatively orientation of the orientation sensors 160 may be evaluated and the orientation of mast 106 determined.

In some embodiments, the calculation, comparison, and command steps described above may be performed by a processor 150, as described with respect to FIG. 1. In some embodiments, the steps may be performed by any means known in the art. The processor 150 may be connected to the orientation sensors 160 and/or the surface equipment via a network. The processor 150 may directly command the surface equipment based on the measurements and/or calculations. In some embodiments, the processor 150 may display the measurements and/or calculations to a human operator.

A similar procedure may be used to lower the mast 106 from the mast-up position to the mast-down position. Orientation sensors 160 may be used to ensure the raising cylinders 180 are retracted simultaneously and that the mast 106 remains at a desired orientation during such a procedure.

Orientation sensors 160 disposed on the floor 108 and the substructure 110 may be used during installation to ensure these components are installed correctly. Orientation sensors 160 installed on the floor 108 may be used to ensure the floor 108 is flat and parallel to the surface of the substrate 190. The orientation and/or position of the floor 108 may be adjusted manually and/or automatically until the floor 108 is approximately or exactly parallel to the surface of the substrate 190. In some embodiments, the floor 108 may be adjusted such that it is in a desired configuration that is not parallel to the surface of the substrate 190. Orientation sensors 160 disposed on the substructure 110 may be used to ensure the positioning and loading of the substructure is optimized as desired. The system 100 and method disclosed herein may enable more precise positioning of the floor 108 and the substructure 110 than previously used systems and methods. Further, it is also envisioned that orientation sensors 160 on other pieces of surface equipment may be used to correctly orient the surface equipment such those types described above during rig-up of the drilling system 100. For example, it may be desirable to correctly locate the pipe handling system relative to other surface equipment to provide greater ease in handling pipe during drilling operations.

In another aspect, embodiments disclosed herein relate methods of using a drilling rig system. Deflections of the drilling rig system 100 or components of the system 100 may occur after the system 100 has been installed in a rig-up configuration. The method disclosed herein may allow for correction of the deflections.

Deflections may occur due to environmental factors. For example, the substrate 190 may settle or move under the weight of the drilling rig system 100. Environmental conditions such as rain, snow, heat, and dryness may cause settling of the substrate 190. Seismic activity may also cause the substrate 190 to shift. Wind loads, especially those caused by repeated or high speed winds may also cause elements of the drilling rig system 100 to deflect.

Deflections may also occur due to operational factors. Load cycles experienced by the drilling rig system 100, such as those caused by carrying the weight of the drill string 114 may cause elements of the drilling rig system 100 to shift relative to each other or to settle relative to the substrate. Mechanical adjustments of elements of the drilling rig system 100 may also cause other elements to shift, settle, or deflect.

Figure 3:
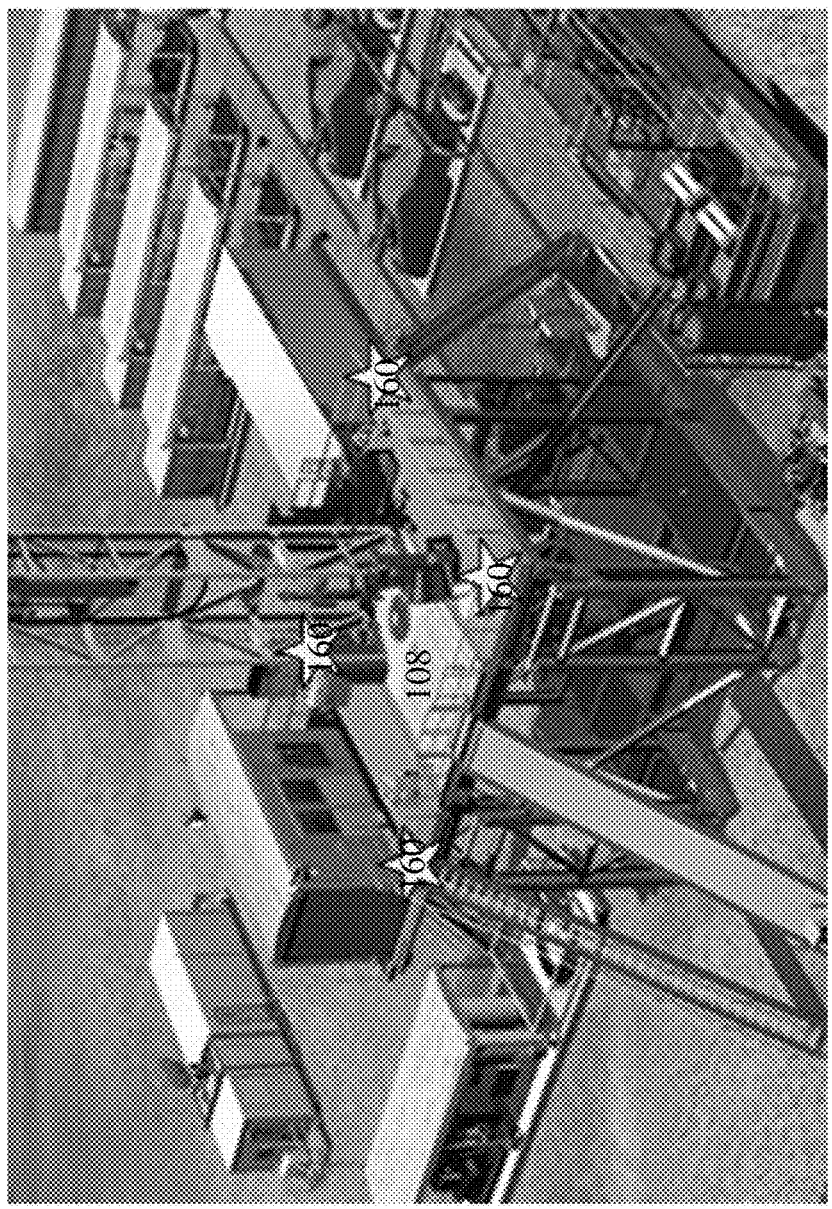
FIG. 3 is a drilling rig system in accordance with the present disclosure.

Embodiments of the method of the present disclosure may provide for monitoring and correction of settling or shifting of the floor 108 of the drilling rig system. FIG. 3 illustrates a drilling rig system 100 having four orientation sensors 160 disposed on the corners of the floor 108. In some embodiments, any number of orientation sensors 160 may be disposed on any portion of the floor 108. The orientation sensors 106 may measure the orientation of each corner of the rig floor 108 in real-time, before, during, and/or after rig operations are performed. A desired orientation of each corner of the floor 108 may be known. In some embodiments, it may be desired that the corners of the floor 108 have the same orientation. A difference between the orientation of each corner and the desired orientation may be calculated, for example by a processor 150. If the difference is greater than a threshold value, the orientation of the floor 108 may be corrected manually or automatically.

Figure 4A:
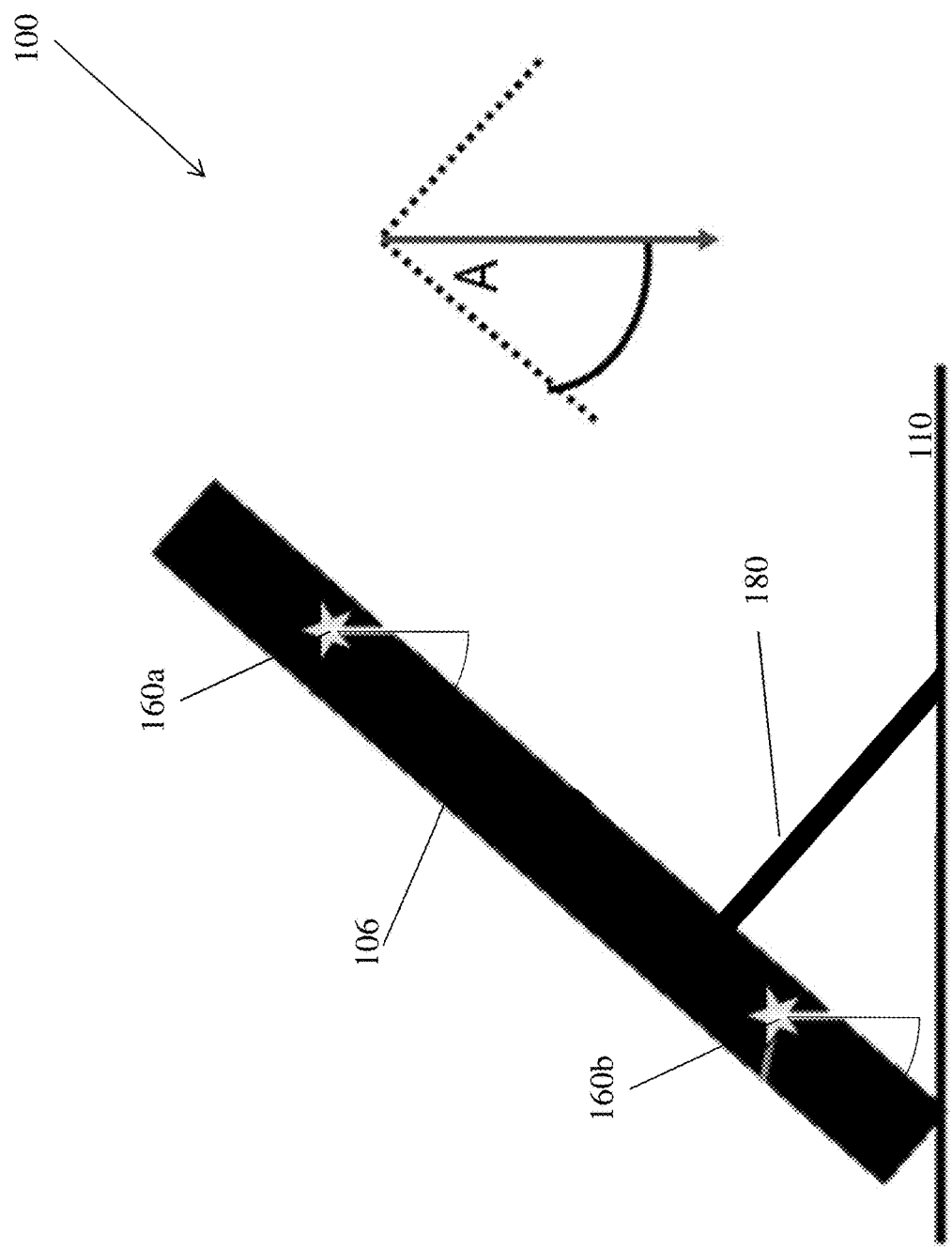
FIG. 4*a* is a schematic view of a drilling rig system in accordance with the present disclosure.
Figure 4B:
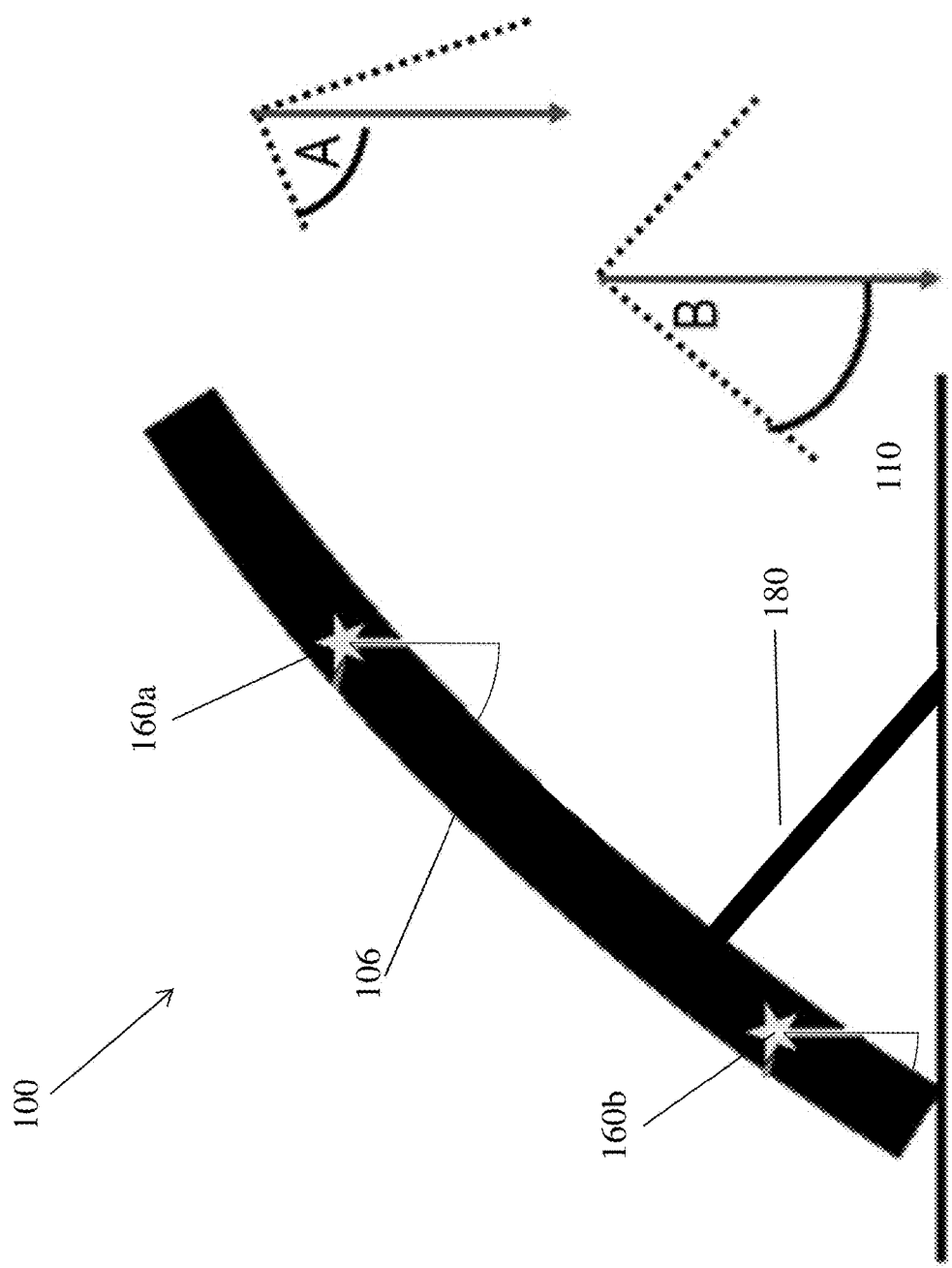
FIG. 4*b* is a schematic view of a drilling rig system in accordance with the present disclosure.

Embodiments of the method of the present disclosure may provide for monitoring and correction of structural deflections of the surface equipment, during installation or operation of the drilling rig system 100. FIGS. 4a and 4b illustrate a drilling rig system 100 during installation/rig up. A mast 106 is disposed on a substructure 110 and supported by a raising cylinder 180. Two orientation sensors 160a and 160b are attached to the mast 106, such that a first orientation sensor 160a is above the raising cylinder 180 and a second orientation sensor 160b is below the raising cylinder.

The orientation sensors 160a, 160b may measure orientations of local regions of the mast 106 in real-time as the mast 106 is being raised. It may be desired that the mast 106 is completely straight while it is being raised. If the mast 106 is completely straight, as shown in FIG. 4a, the orientation sensors 160a, 160b may measure the same orientation, such that both sensors 160a, 160b measure an orientation at an angle "A" from a vertical axis.

Bending/deflection of the mast 106 may be detected and quantified based on the measurements made by the orientation sensors 160a, 160b. As shown in FIG. 4b, the mast 106 may deflect during the raising process. The first orientation sensor 160a, which measures an orientation of a local region of the upper end of the mast 106 may measure an orientation at an angle "A" from a vertical axis. The second orientation sensor 160b, which measures an orientation of a local region of the lower end of the mast 106 may measure an orientation at an angle "B" from a vertical axis. The orientation sensors 160a, 160b may transmit the orientation measurements to a processor 150. The processor may calculate the difference between angle "A" and angle "B." This difference may quantify the bending/deflection of the mast 106. If the bending/deflection of the mast 106 is above a threshold, corrective action may be taken. Such corrective action may include stopping or slowing installation or operation of the drilling rig system 100 or replacing the mast 106 and/or the raising cylinders 180. Corrective action may be performed automatically via a command sent by the processor 150 or via the action of a human operator.

A similar procedure may be used to detect structural deflections of the mast 106 or any other piece of surface equipment, during installation, operation, down-time, or disassembly of the drilling rig system 100.

Embodiments of the method of the present disclosure may provide for monitoring and correction of structural deflections of elements the surface equipment which move during installation or operation of the drilling rig system 100. Such elements may include a pipe-handling system, top-drive elevator arms, top-drive rails, or any moving element of the surface equipment.

An orientation of two local regions of a piece of moving surface equipment or a relative orientation of two different pieces of moving surface equipment may be measured during operation of the drilling rig system 100. The relative orientation of the local regions or the pieces of equipment may be compared to a desired relative orientation. If the difference between the desired relative orientation and the actual relative orientation is greater than a threshold, corrective action may be performed automatically or manually.

Corrective action may include control operations, such as accelerating or decelerating movement of the surface equipment or stopping movement of some elements of surface equipment. This may allow operations of the drilling rig system 100 to be maintained at optimal performance, thereby improving system efficiency, reducing downtime, and preventing damage to the system. Corrective action may also include replacement of degraded surface equipment. Surface equipment may be designed such that reduced or increased deflection correlates to equipment degradation. This may allow surface equipment to be replaced when it is performing sub-optimally, before the degraded surface equipment affects system performance or causes failure of the system.

In some embodiments of the method disclosed herein, orientation sensors 160 may be used to detect movement of surface equipment in a drilling rig system 100. In some embodiments, orientation sensors 160 may detect undesired movement by measuring orientation of a component which is intended to be stationary in real-time, such that a change in orientation correlates to an undesired movement. Accelerometers may be used instead of or in addition to orientation sensors 160 in such embodiments. If undesired movement is detected, automatic or manual corrective action may be taken, and may include control operations or component replacement as described above.

The systems and methods disclosed herein may improve the safety and efficiency of drilling rig operations. Drilling rig systems as disclosed herein may be less likely to experience failure than traditional drilling rig systems, leading to less downtime of the system and less risk to personnel and the surrounding environment. Drilling rig system components may also be able to be replaced at optimal times, such that degraded components do not continue to be used, but also such that components are not replaced while they are still functioning optimally. Drilling rig operations may be maintained at optimal levels for efficiency and desired results.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of rigging up a drilling rig, the method comprising:

raising a mast and a substructure of the drilling rig using at least one hydraulic cylinder;

measuring a position and/or an orientation of at least one of the mast, the substructure, and the at least one hydraulic cylinder, wherein the measuring is performed in real time, and is repeated one or more times as the mast and the substructure are raised from a rig-down position to a rig-up position;

positioning the hydraulic cylinder based on the position and/or the orientation of the mast, the substructure, and/or the at least one hydraulic cylinder; and comparing the location and/or the orientation of the first hydraulic cylinder at a chosen time to the location and/or the orientation of the second hydraulic cylinder at the chosen time.

2. The method of claim 1, further comprising calculating a difference between the location and/or the orientation of the first hydraulic cylinder and the location and/or the orientation of the second hydraulic cylinder and comparing the difference to a threshold difference.

3. The method of claim 2, further comprising commanding an element of the drilling rig to perform a correctional operation if the difference is greater than the threshold difference.

4. The method of claim 3, wherein the correctional operation comprises adjusting the orientation of one or both of the hydraulic cylinders, adjusting a speed at which one or both of the hydraulic cylinders is moving, and/or stopping motion of one or both of the hydraulic cylinders.

5. A method of monitoring a drilling rig comprising a plurality of surface rig equipment, the method comprising:

measuring an orientation and/or a position of a first of the plurality of surface rig equipment;

measuring an orientation and/or a position of a second of the plurality of surface rig equipment; and determining a relational positioning of the plurality of surface rig equipment, wherein the measuring is performed in real time, and is repeated one or more times during rig operations, and wherein measurements are stored.

6. The method of claim 5, further comprising comparing the orientation and/or position of the first of the plurality of surface rig equipment and the second of the plurality of surface rig equipment at a chosen present time to the orientation and/or position of the first of the plurality of surface rig equipment and the second of the plurality of surface rig equipment at a past time and calculating a difference between the present orientations and/or positions and the past orientations and/or positions.

7. The method of claim 6, further performing a correctional operation if the difference is greater than a threshold difference.

8. The method of claim 7, wherein the first of the plurality of surface rig equipment and second of the plurality of surface rig equipment comprise a single element of the plurality of surface rig equipment, and further comprising calculating a difference between the orientation and/or position of the first location and the orientation and/or position of the second location.

9. The method of claim 7, further performing a correctional operation if the difference is greater than a threshold difference.

* * * * *